US010408116B2

(12) United States Patent
Reeves et al.

(10) Patent No.: US 10,408,116 B2
(45) Date of Patent: Sep. 10, 2019

(54) SNOWMOBILE

(71) Applicant: Polaris Industries Inc., Medina, MN (US)

(72) Inventors: Matthew D. Reeves, North Branch, MN (US); Joseph D. Tharaldson, Taylor Falls, MN (US); Lawrence J. Hosaluk, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 15/723,927

(22) Filed: Oct. 3, 2017

(65) Prior Publication Data
US 2019/0101043 A1 Apr. 4, 2019

(51) Int. Cl.
*F01P 5/04* (2006.01)
*F02N 11/04* (2006.01)
*F01P 1/06* (2006.01)

(52) U.S. Cl.
CPC ............... *F01P 5/04* (2013.01); *F02N 11/04* (2013.01); *B60Y 2200/252* (2013.01); *F01P 1/06* (2013.01)

(58) Field of Classification Search
CPC ........... F01P 2001/005; F01P 5/06; F01P 1/06
See application file for complete search history.

(56) References Cited

U.S. PATENT DOCUMENTS

| 3,747,649 | A | * | 7/1973 | Densow | B27B 17/08 123/149 D |
|---|---|---|---|---|---|
| 3,952,712 | A | * | 4/1976 | Hermanson | F01P 5/02 123/41.65 |
| 4,859,886 | A | * | 8/1989 | Tanaka | F02B 63/04 310/51 |
| 5,078,101 | A | * | 1/1992 | Anderson | F01P 1/06 123/149 D |
| 6,378,468 | B1 | * | 4/2002 | Kouchi | F02B 63/04 123/195 C |
| 6,489,690 | B1 | * | 12/2002 | Hatsugai | F02B 63/04 123/2 |
| 2004/0144344 | A1 | * | 7/2004 | Yashirodai | F01L 1/446 123/73 PP |
| 2008/0238221 | A1 | * | 10/2008 | Yamamoto | F02B 63/04 310/51 |
| 2009/0091137 | A1 | * | 4/2009 | Nishida | F02B 63/04 290/1 R |
| 2009/0229544 | A1 | * | 9/2009 | Hatsugai | F02B 63/04 123/41.56 |
| 2014/0159517 | A1 | * | 6/2014 | Furuya | H02K 5/02 310/43 |
| 2016/0339997 | A1 | * | 11/2016 | Crain | B60L 50/10 |
| 2017/0167463 | A1 | * | 6/2017 | Wolf | B23D 57/023 |

* cited by examiner

Primary Examiner — Long T Tran
(74) Attorney, Agent, or Firm — Harness, Dickey & Pierce, P.L.C.

(57) ABSTRACT

A cooling system for an internal portion of an engine assembly. The cooling system includes a fan assembly. The fan assembly rotates with a flywheel mounted to a crankshaft.

20 Claims, 10 Drawing Sheets

SNOWMOBILE

FIELD

The subject disclosure relates to a vehicle, in particularly to an engine assembly for the vehicle.

BACKGROUND

A vehicle, such as a snowmobile, generally includes an engine assembly. The engine assembly is operated with the use of fuel to generate power to drive the vehicle. The power to drive a snowmobile is generally generated by a combustion engine that drives pistons and a connected crank shaft. The crank shaft may be associated with an electrical generating unit, such as an alternator or a generator. The alternator may be operated to generate electrical power for various features, such as spark to the engine, operation of electronical components including lights and navigation systems, and the like. During operation of the alternator, thermal energy may be generated that is selected to be dissipated during use. Dissipation of heat from the alternator may be performed for various reasons, but selectively reduces an operating temperature of the alternator during use.

SUMMARY

An alternator that is powered by an engine may generally include at least two components including a stator unit and a moving rotor component. In various embodiments, the rotor component rotates by being driven by a crank shaft. For example, the crank shaft is connected to a fly wheel component that moves relative to a stator. In various embodiments, the fly wheel moving relative to the stator may be referred to as a generator or an alternator flywheel.

Because of movement of the rotor relative to the stator, a current is generated through coils or windings of the stator. In addition to the current, resistance to the current in the windings may generate thermal energy. Movement of the rotor, with or due to the fly wheel, may also generate thermal energy. An increase of temperature may occur due to the presence of the thermal energy. A fan assembly may, therefore, be associated with the rotating component, such as the fly wheel, to assist in removing or dissipating the thermal energy and reducing the lowering of temperature of the stator or alternator assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments will now be described more fully with reference to the accompanying drawings. Although the following description includes several examples of a snowmobile application, it is understood that the features herein may be applied to any appropriate vehicle, such as motorcycles, all-terrain vehicles, utility vehicles, moped, scooters, etc. The examples disclosed below are not intended to be exhaustive or to limit the disclosure to the precise forms disclosed in the following detailed description. Rather, the examples are chosen and described so that others skilled in the art may utilize their teachings.

Figure 1:
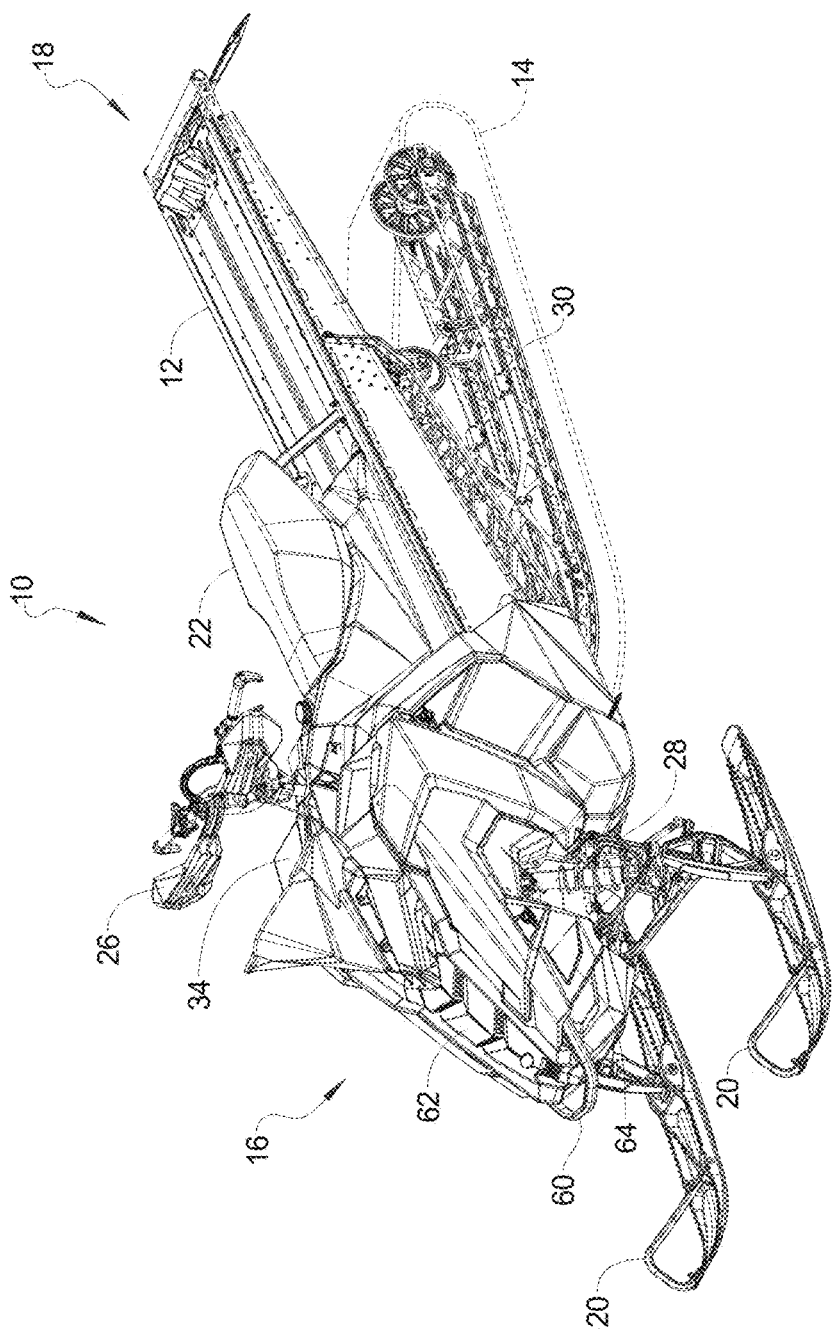
FIG. 1 is a perspective view of a snowmobile.
Figure 2:
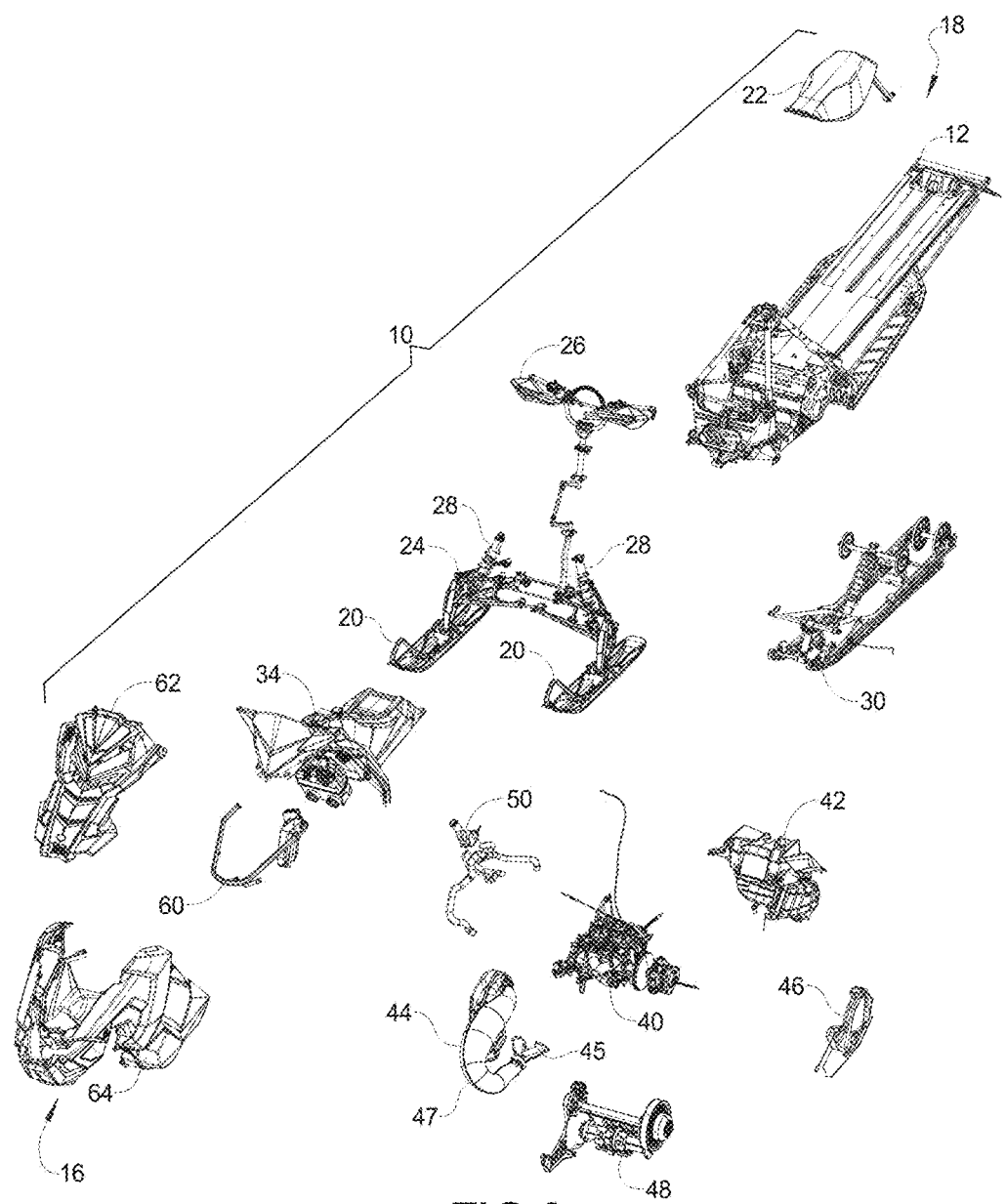
FIG. 2 is an exploded view of the snowmobile of FIG. 1.
Figure 2A:
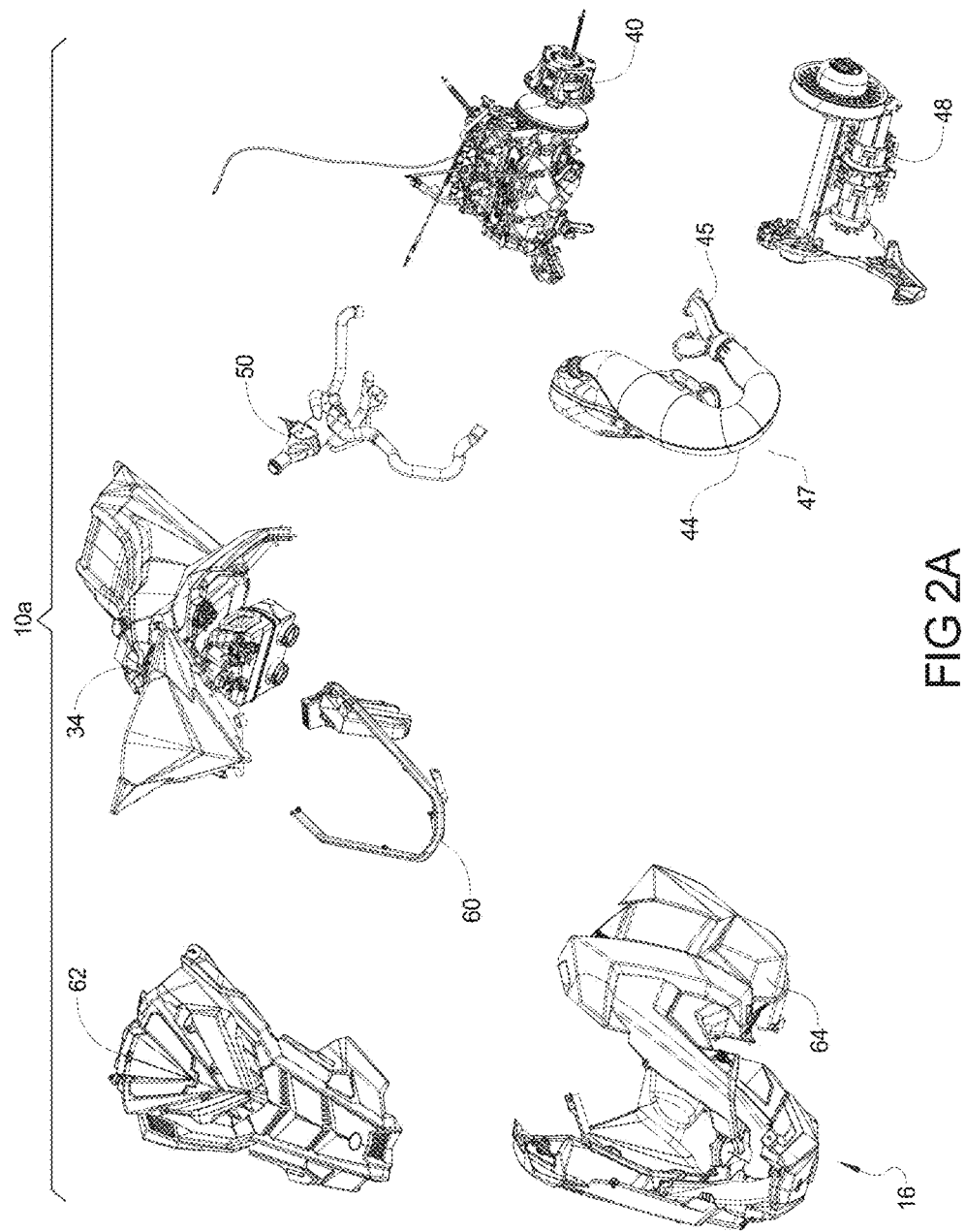
FIGS. 2A and 2B are enlarged exploded views of FIG. 2.
Figure 2B:
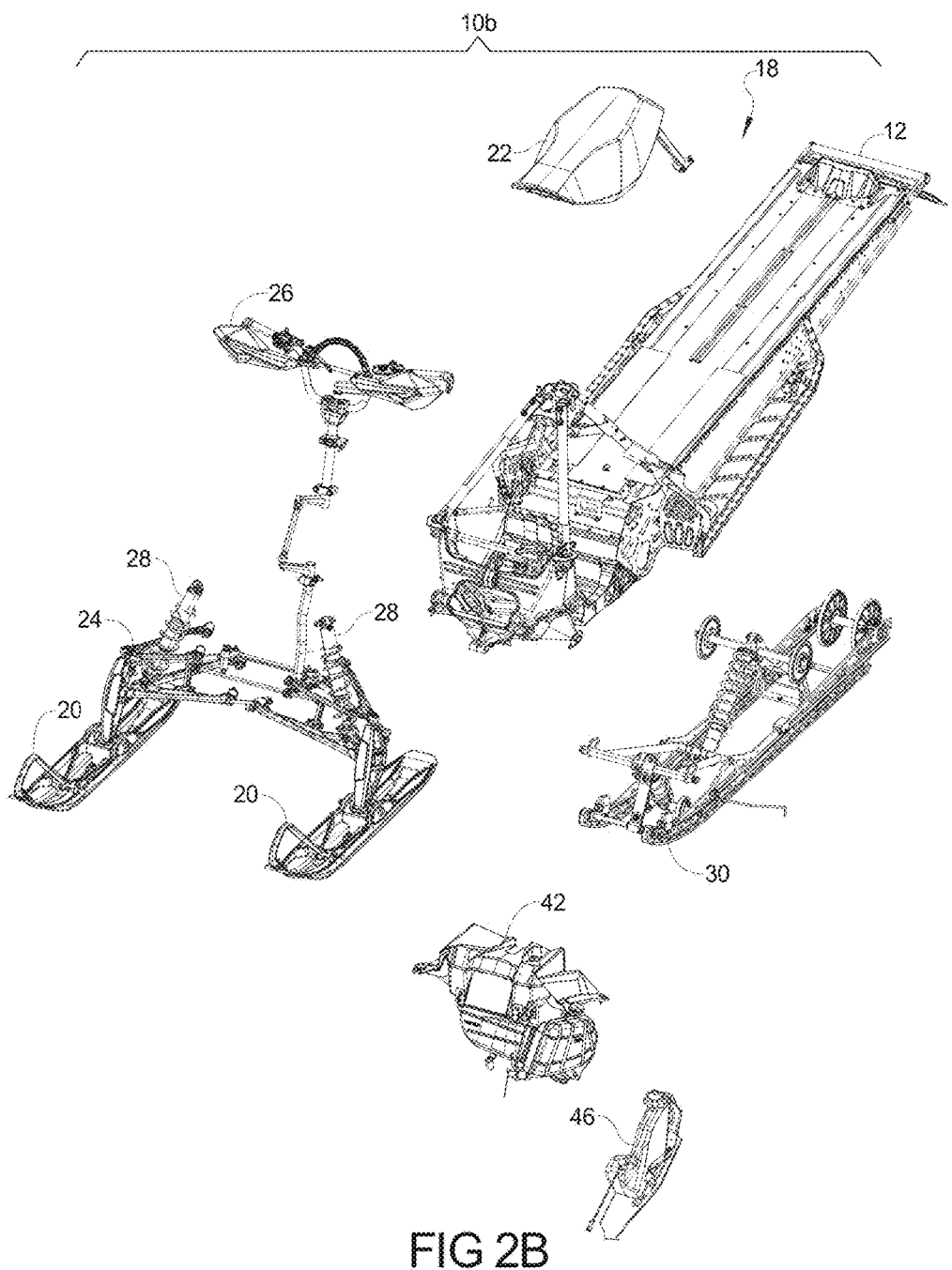

Referring now to FIGS. 1, 2, 2A, and 2B, one embodiment of an exemplary snowmobile 10 is shown. Snowmobile 10 includes a chassis 12, an endless belt assembly 14, and a pair of front skis 20. Snowmobile 10 also includes a front-end 16 and a rear-end 18. A detail exploded view is illustrated in FIGS. 2A and 2B wherein the exemplary snowmobile 10 is illustrated as separate snowmobile sub-portions 10a and 10b.

The snowmobile 10 also includes a seat assembly 22 that is coupled to the chassis assembly 12. A front suspension assembly 24 is also coupled to the chassis assembly 12. The front suspension assembly 24 may include handlebars 26 for steering, shock absorbers 28 and the skis 20. A rear suspension assembly 30 is also coupled to the chassis assembly 12. The rear suspension assembly 30 may be used to support the endless belt 14 for propelling the vehicle. An electrical console assembly 34 is also coupled to the chassis assembly 12. The electrical console assembly 34 may include various components for displaying engine conditions (i.e., gauges) and for electrically controlling the snowmobile 10.

The snowmobile 10 also includes an engine assembly 40. The engine assembly 40 is coupled to an intake assembly 42 and an exhaust assembly 44. The intake assembly 42 is used for providing fuel and air into the engine assembly 40 for the combustion process. Exhaust gas leaves the engine assembly 40 through the exhaust assembly 44. An oil tank assembly 46 is used for providing oil to the engine for lubrication and for mixing with the fuel in the intake assembly 42. A drivetrain assembly 48 is used for converting the rotating crankshaft assembly from the engine assembly 40 into a potential force to use the endless belt 14 and thus the snowmobile 10. The engine assembly 40 is also coupled to a cooling assembly 50.

The chassis assembly 12 may also include a bumper assembly 60, a hood assembly 62 and a nose pan assembly 64. The hood assembly 62 is movable to allow access to the engine assembly 40 and its associated components.

Figure 3A:
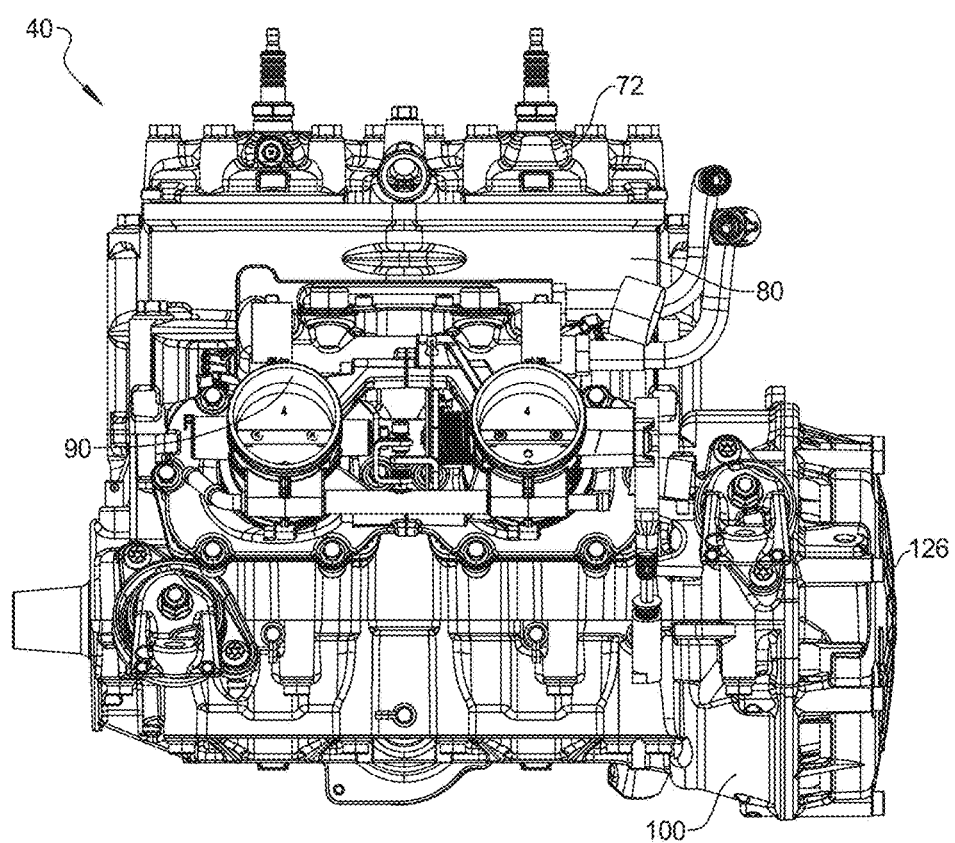
FIGS. 3A and 3B are opposite side views of the engine of FIG. 2.
Figure 3B:
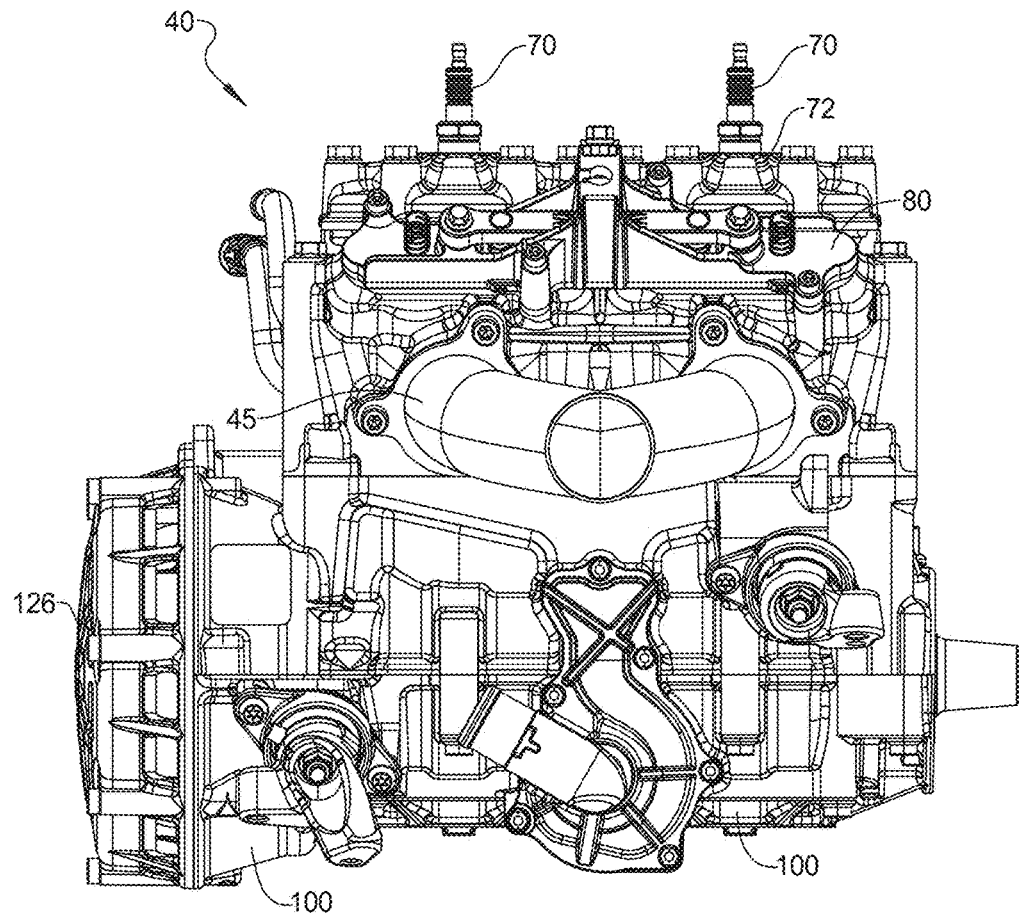
Figure 4:
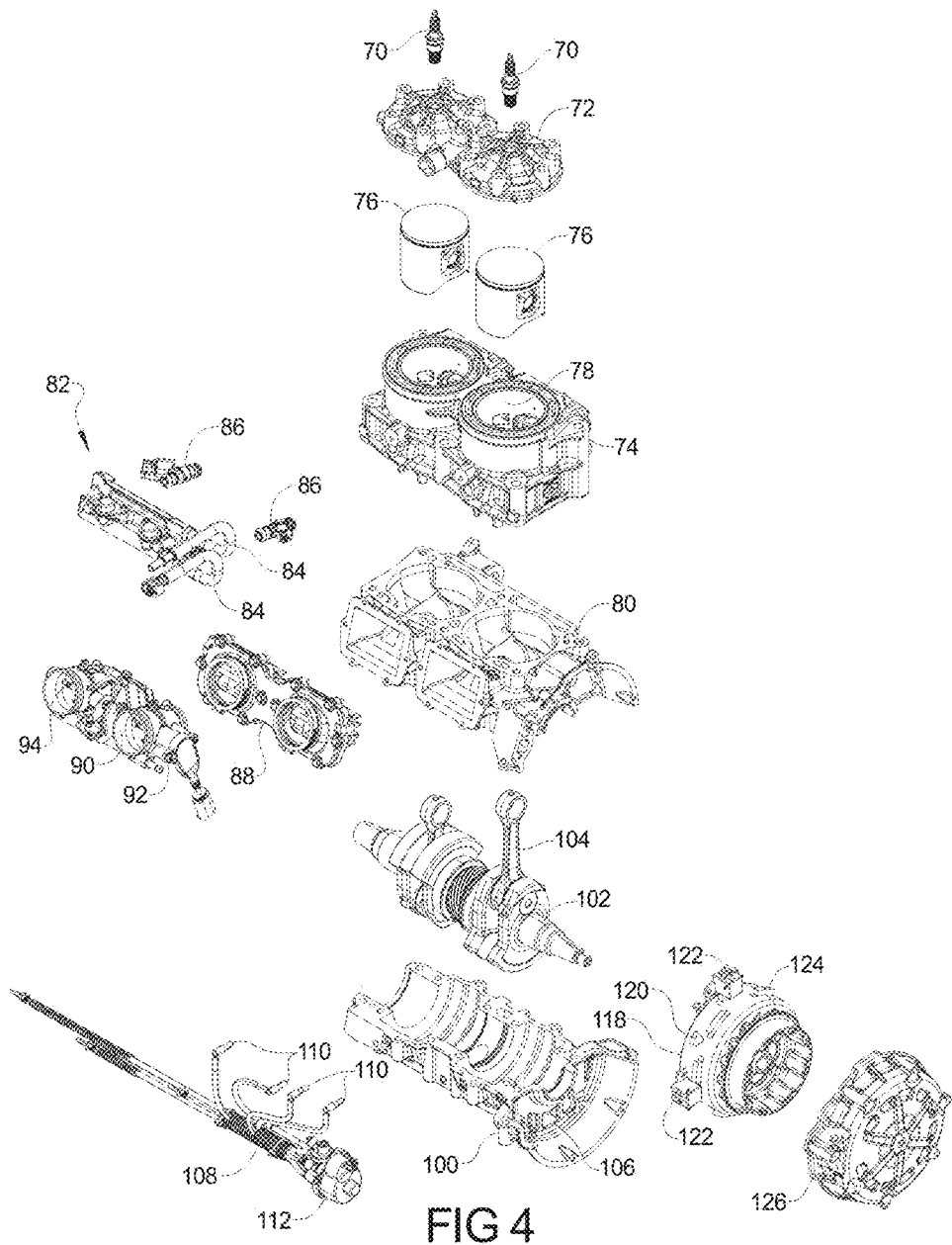
FIG. 4 is an exploded view of the engine of FIG. 3.

Referring now to FIGS. 3A, 3B and 4, the engine assembly 40 is illustrated in further detail. The engine assembly 40 is a two-stroke engine that includes the exhaust assembly 44 that includes an exhaust manifold 45 and an exhaust pipe 47.

The engine assembly 40 may include spark plugs 70 which are coupled to a one-piece cylinder head cover 72. The cylinder head cover 72 is coupled to the cylinder head 74 with six bolts which is used for housing the single-ring pistons 76 to form a combustion chamber 78 therein. The cylinder head 74 is mounted to the engine block 80.

The fuel system 82 that forms part of the intake assembly 42, includes fuel lines 84 and fuel injectors 86. The fuel lines 84 provide fuel to the fuel injectors 86 which inject fuel, in this case, into a port adjacent to the pistons 76. An intake manifold 88 is coupled to the engine block 80. The intake manifold 88 is in fluidic communication with the throttle body 90. Air for the combustion processes is admitted into the engine through the throttle body 90 which may be controlled directly through the use of an accelerator pedal or hand operated switch. A throttle position sensor 92 is coupled to the throttle to provide a throttle position signal corresponding to the position of a throttle valve of throttle plate 94 to an engine controller discussed further herein.

The engine block 80 is coupled to crankcase 100 and forms a cavity for housing the crankshaft 102. The crankshaft 102 has connecting rods 104 which are ultimately coupled to the pistons 76. The movement of the pistons 76 within the engine chamber 78 causes a rotational movement at the crankshaft 102 by way of the connecting rods 104. The crankcase 100 may have openings or vents 106 therethrough.

The system is lubricated using oil lines 108 which are coupled to the oil injectors 110 and an oil pump 112.

The crankshaft 102 is coupled to a generator flywheel 118 and having a stator 120 therein. The flywheel 118 has crankshaft position sensors 122 that aid in determining the positioning of the crankshaft 102. The crankshaft position sensors 122 are aligned with the teeth 124 and are used when starting the engine, as well as being used to time the operation of the injection of fuel during the combustion process. A stator cover 126 covers the stator 120 and flywheel 118.

As discussed above in relation to FIG. 4, the engine assembly 40 includes various components, some of which move due to operation of the engine assembly 40. The crank shaft 102 is connected to the fly wheel 118. The fly wheel 118 includes various components, as discussed above, including the sensor interactors or teeth 124. As also discussed above, the engine assembly 40 may include components that interact with the fly wheel 118 including the sensors 122 that may sense or interact with the teeth 124. In addition, the fly wheel 118 includes a center or central connection region 1202. The connection region 1202 may connect with or be connected to a terminal end 1204 of the drive shaft 102. In various embodiments, a bolt or nut 1206 is connected to the terminal end 1204 of the crank shaft 102.

Given the connection of the fly wheel 118 to the crank shaft 102, upon rotation of the crank shaft 102, the fly wheel 118 also rotates. The fly wheel 118 rotates relative to the stator 120. The stator 120 is fixed relative to the crank case 100. In particular, the crank case 100 includes an end housing 1208 that is coupled with the external cover 126, the cover 126 may also be referred to as a stator or recoil cover. Covered by the cover 126 may be a generally known pull cord recoil system for starting the engine assembly 40. The stator 120 is fixed relative to the crank case 100 in the housing 1208 and is fixed relative to the fly wheel 118. Therefore, as the fly wheel 118 rotates relative to the stator 120, an alternating current, of various phases and/or selected phases, is generated. The generated current may be carried away from the stator 120 according to various embodiments, such as via a wiring or wiring harness assembly (not illustrated). The fly wheel 118 may also have connected therewith a magnet ring 1212 that, therefore, also rotates relative to the stator 120.

The operation of the engine assembly 40 may drive the crank shaft 102. Operation or movement of the fly wheel 118 relative to the stator 120 may generate a current as noted above. Further, the generation of the current from the stator 120 may also generate thermal energy. The thermal energy may be due to resistance of one or more wires, such as those in a winding 1216. The winding 1216 may include a plurality of windings 1216 formed on a core 1218 of the stator 120. The core 1218 may include one or more projections or fingers 1220 on which the windings 1216 are placed.

The core 1218 may be formed of selected materials, such as non-magnetic materials. Further, the core 1218 may be formed of two or more components including an internal metallic (e.g. metal or metal alloy) component and an external non-conductive sheath on which the windings 1216 are formed or placed. In various embodiments, due to a current through wire that forms the windings 1216 thermal energy may be generated. It is understood, however, that the windings 1216 may be formed of a metallic or non-metallic wire or other appropriate material. In various embodiments, the windings 1216 are formed of a copper wire.

Thermal energy within or at the stator 120 may be dissipated according to various embodiments, such as a flow of air, or airflow, over or through the windings 1216. The airflow may be caused or provided due to the one or more openings or throughbores 106 formed in the crank case 100. The crank case 100 may include the openings 106 that allow the housing 1208 to be exposed to or receive external airflow, such as external from the engine assembly 40 and/or the snowmobile 10.

The airflow may travel along an airflow path 1226 that is initiated or started external to the crank case 100 and passes through the openings 106. The air that initiates or starts from external to the crank case 100 may be substantially cooler than air that is within the engine assembly 40. Further the openings 106 may be formed in the crank case 100 at a position that is at or near a cool region of the engine assembly 40. A cool region of the engine assembly may be a region that is substantially positioned away from heat sources or other hot air or thermal sources, such as an exhaust manifold, evaporation fins or passages, or the like. Further, the cool region may be near or at a riding surface (e.g. ground) and/or near the skis 20. In various operating conditions, such as with snow cover on a riding surface, the riding surface may be substantially cooler than other areas. Thus, the region of the engine assembly 40 that is the coolest may be near the riding surface and away from heat sources, such as cylinders or exhaust manifold.

In various embodiments, as illustrated in FIG. 4 and the other figures above, the openings 106, also referred to as air vents or vent openings, may be positioned substantially at a side of the snowmobile 10 and near a bottom of the engine assembly 40, and generally in a cool region of the engine assembly 40, as noted above. In various embodiments, the openings 106 in the crank case 100 may be positioned substantially near a surface or area over which the snowmobile 10 is passing. Therefore, the air drawn through the vent openings 106 may be cooler than substantially any other air source or air volume adjacent or near the engine assembly 40.

Figure 5:
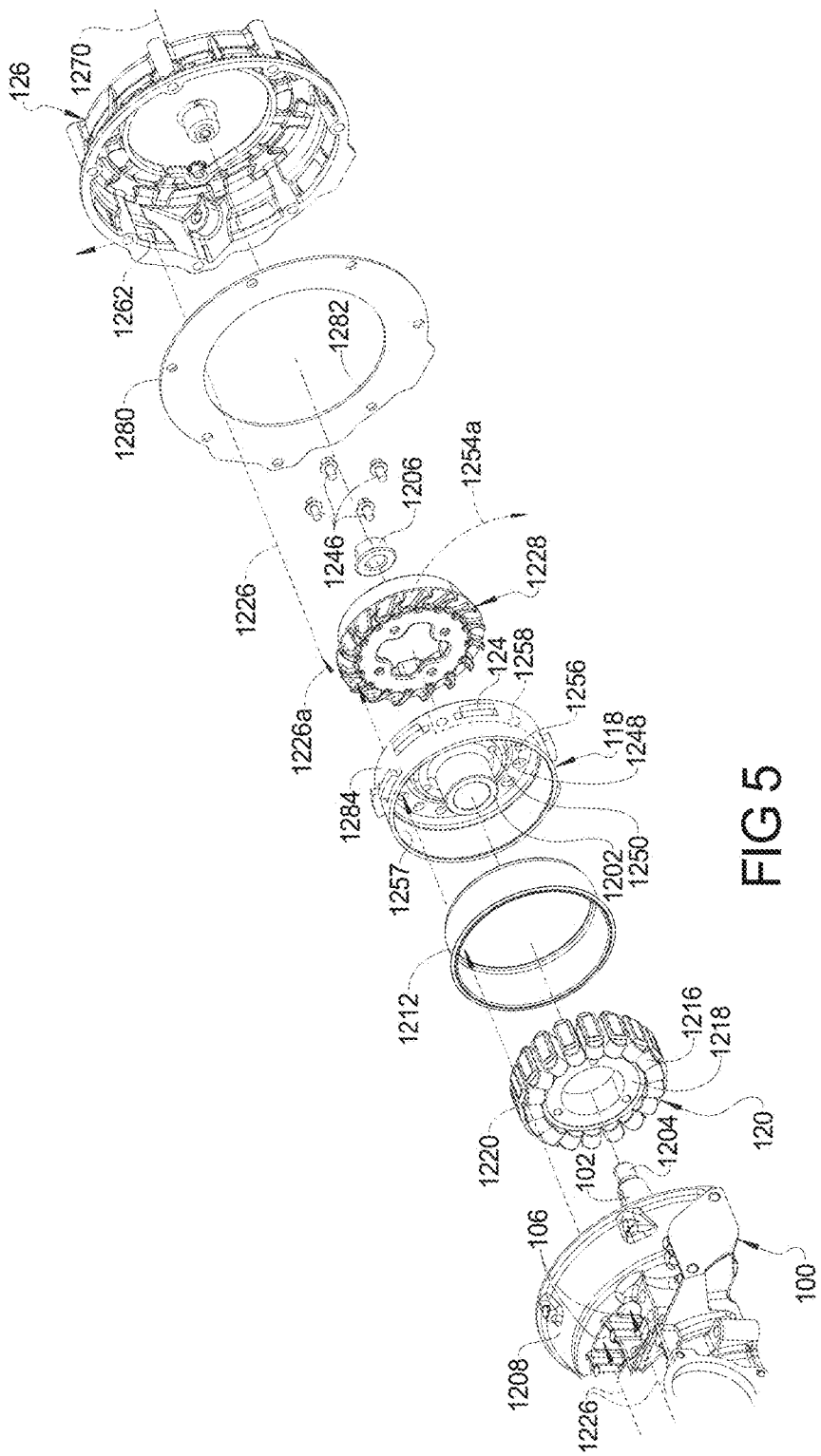
FIG. 5 is a detail exploded view of a generator portion of the engine assembly.

The airflow through the air vents or openings 106 may be caused by a fan portion or assembly 1228. With continuing reference to FIG. 5 and additional reference to FIG. 6, the fan assembly 1228 includes various features such as one or more cooling fins or veins 1230. The fins 1230 extend from a surface or body 1232. The fins 1230 may include an upper surface or contacting surface 1234. The contacting surface 1234 may be near and/or contact a face or surface 1248 of the fly wheel 118. The fan assembly 1228 may further include a contact or mounting surface 1236 from which the fins 1230 radially extend towards an outer edge or perimeter 1238 of the fan assembly 1228.

The mounting surface 1236 may be substantially solid or include a central opening or aperture 1240. The central aperture 1240 may be defined or formed by an interior wall 1242. In addition, one or more through bores 1244 may be formed through the mounting surface 1236. One or more mounting fasteners 1246, such as bolts or rivets, may pass through the apertures 1244 and engage the fly wheel 118. The fly wheel 118 may include the mounting surface or face 1248. The mounting surface 1248 may include a fastening passage 1250 that may receive or threadably engage the fasteners 1246. For example, the passages 1250 in the mounting face 1248 may be tapped or include threads to receive or engage the bolt 1246. It is understood that other appropriate fastening members, however, may be provided or used to fix the fan assembly 1228 to the fly wheel 1248.

Because the fan assembly 1228 is fixed to the fly wheel 118, such as via the mounting face 1248, the fan assembly 1228 rotates substantially in common or due to rotation of the fly wheel 118. Accordingly, when the fly wheel 118 rotates, the fan assembly 1228 also rotates. Rotation of the flywheel 118 is caused by the drive shaft 102 connected to the fly wheel 118. The engine assembly 40, including the drive shaft 102, therefore, causes rotation, and generally simultaneous rotation, of the flywheel 118 and the fan assembly 1228.

Formed between or defined between two adjacent fins 1230 may be an airflow or pocket area 1254 that may cause airflow generally in the direction of the air-path 1226, as illustrated in FIG. 5, and specifically in the direction of arrow 1226a. The air-path 1226 initiates through the vent openings 106, and passes through the stator 120, such as between the winding 1216. The air-path 1226 further continues through the magnetic ring 1212 that is positioned within the fly wheel 118. The air-path 1226 further extends through one or more flywheel vents passages or through-bores 1256.

The flywheel vent passages 1256 are formed in the mounting face 1248 and may not be the only passages through the fly wheel 118. For example, the flywheel 118 may include a second wall or annular member 1257 that extends substantially perpendicular to the face 1248. The second wall 1257, when assembled in the engine assembly 40, may encompass or surround the stator 120. Further, the second wall 1257 generally extends away from and one a side opposite the fan assembly 1228. Alternatively or in addition to the vent passages 1256, auxiliary or outer surface passages 1258 may be formed through the second wall 1257. The rotation of the fan assembly 1228 may cause a low pressure on or near an outer face of the mounting face 1248, generally in the downstream direction indicated by the air-path 1226.

The rotation of the fan assembly 1228 may cause the airflow or a flow of air generally in the direction of air-path 1226 through the vent openings 1256 and through the pockets 1254 due to the fins 1230 and associated structure and geometry, such as opening of the pocket 1254 at the outer edge 1238 of the fan assembly 1228. The air-path 1226, therefore, continues toward an outer edge or outer circumference 1238 of the fan assembly 1228. In other words, as illustrated in FIG. 5, the air-path 1226 may include a radial flow in the direction of arrow 1226a away from a central axis 1270 of the fan assembly 1228. The fan assembly 1228 by rotating and having the pockets 1254 direct air flow away from an axis of rotation of the fan assembly 1228. The pockets 1254, therefore, may include an airflow exit or exit passage for the air that is being moved by the fan assembly 1228. The flow may, therefore, not be straight and may move radially away from the center of the fan assembly and generally in a direction formed or defines by the pocket 1254. This direction may also direct the air toward an outer edge of the cover 126, as discussed herein.

The air-path 1226 may then pass through a vent opening 1262 in the cover 126. Accordingly, the air-path 1226 is formed through the housing 1208 of the crank case 100 by the air vents 106. The air-path 1226 passes through the stator 120, the mounting face 1248 of the fly wheel 118, past the fins 1230 of the fan assembly 1228, and out through the vent passages 1262 of the cover 126. The air flow along the air-path 1226 may be caused due to the fan assembly 1228, such as with the fins 1230, as discussed further herein.

Figure 6:
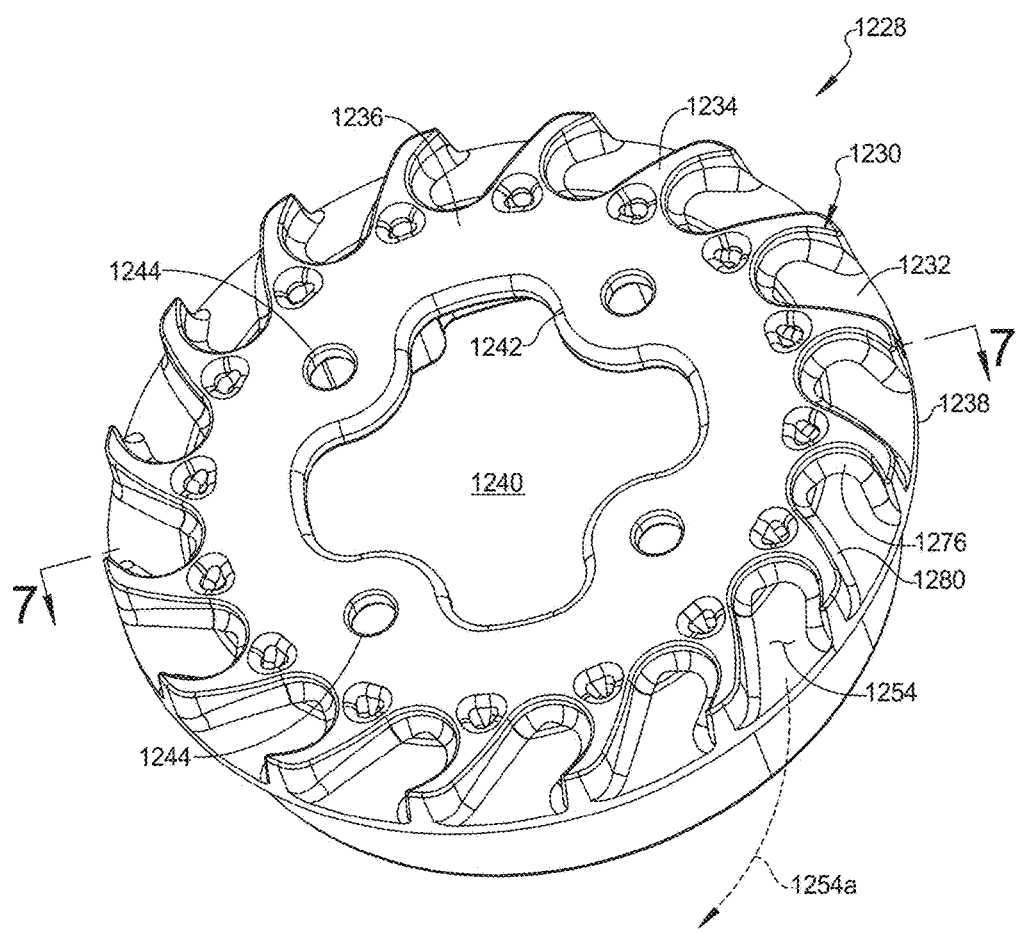
FIG. 6 is a perspective view of a fan assembly.
Figure 7:
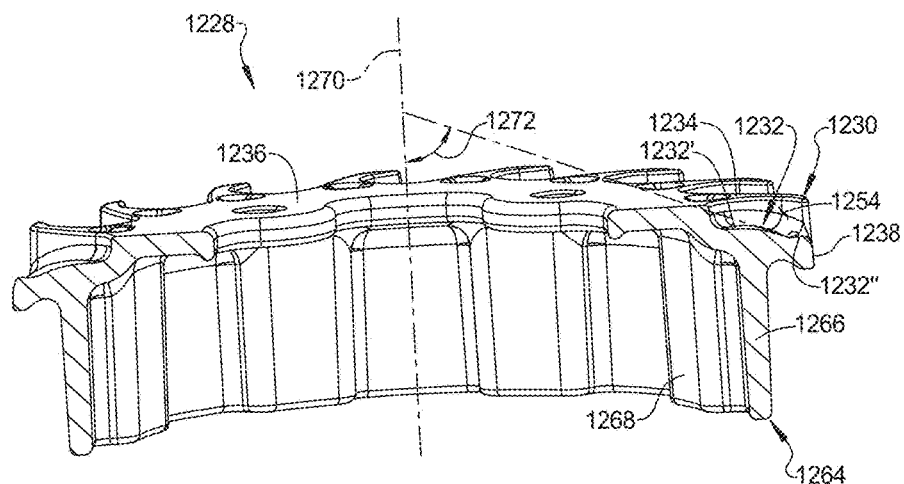
FIG. 7 is a cross-section view of the fan assembly along lines 7-7.
Figure 8:
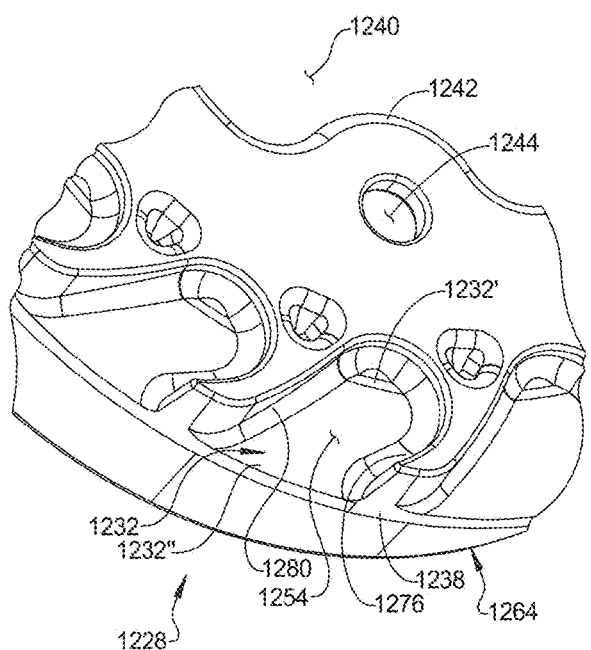
FIG. 8 is a detail view of a portion of the fan assembly of FIG. 6.

With continuing reference to FIG. 6 and additional reference to FIGS. 7 and 8, the fan assembly 1228 is discussed. The fan assembly 1228 may include an integrally formed recoil cup or holder 1264. The recoil cup 1264 may include an outer circumferential wall 1266 that includes a selected geometry, such as an array of internal projections 1268. The outer wall 1266 may engage a recoil assembly, such as pull cord recoil assembly, that may be used to initiate starting of the engine assembly 40. It is understood, however, that the recoil assembly need not be incorporated into the fan assembly 1228. For example, the fan assembly 1228 may include the fins 1230 and selected features, such as the surface member 1232, mounted to the recoil cup 1264 to form an integrated fan assembly 1228. In various embodiments, however, the fan assembly 1228, including the fins 1230 and related structures, and the recoil cup 1264 form as separate and distinct members. In various embodiments, the fan assembly 1228 may be formed as a single piece a casting including the fan portions and the recoil cup 1264. The single casting may be formed of a magnesium or magnesium alloy. The integrated or one piece casting may allow for a lightweight and substantially rigid structure to connect to the fly wheel 118. Nevertheless, one skilled in the art will understand that the various portions of the fan assembly 1228 may be formed separately and connected together such as with brazing or welding during a manufacturing process.

The fan assembly 1228 including the fins 1230 may form a vacuum on a selected side of the fly wheel 118, thereby causing air flow along the air-path 1226, due to a construction of the fan assembly portion. As discussed above, the fins 1230 extend from a surface 1232. The surface 1232 may be formed in the pocket 1254, as illustrated in FIG. 6. In the pocket 1254, a first region 1232' of the surface 1232 may be closer to the mounting plate surface 1236 near a central or rotational axis 1270 of the fan assembly 1228 than an outer surface or region 1232". The surface 1232, therefore, may be sloped or formed at an angle 1272 relative to the axis 1270. The angle 1272 of the surface 1232 may assist in forming, directing, or otherwise causing an airflow through the vent opening 106 and the crank case 100 and the passages 1256 of the fly wheel 118.

In addition to the angle 1272 of the surface 1232, the fins 1230 may include a curved or arcuate surface 1276. The curved surface 1276 of the fins 1230 may be substantially c-shaped having an inner curved portion or inner surface 1276 and a back or second surface 1280 of an adjacent fin 1230.

The pocket 1254 may be formed between the two surfaces 1276, 1280 and the surface 1232 between two adjacent fins 1230. The pocket 1254 and the respective fins 1230, including the surfaces 1276, 1280, and the base surface 1232 form the fan structure of the fan assembly 1228 to cause airflow along the path 1226.

Due to rotation of the fan assembly 1228, by being mounted to the fly wheel 118, the fan assembly 1228, given the structure as discussed above, may cause the airflow along the air-path 1226. Due to the airflow along the air-path 1226, the stator 120 may be cooled by removing the thermal energy generated by the stator 120, as discussed above. Thus, the stator 120 may be operated within a selected temperature range during operation of the engine assembly 40.

In various embodiments, a shroud or seal member 1280 may also, optionally, be mounted in the engine assembly 40. The shroud 1280 may be positioned to surround the fly wheel 118 and the mounted relative to the housing 1208 of the crank case 100. The shroud 1280 may be fixed between the cover 126 and the housing 1208. The shroud 1280 may have an internal opening 1282 that has a tight or close spaced tolerance relative to an outer surface 1284 of the fly wheel 118. The tolerance or spacing between the inner surface 1282 of the shroud 1280 and the outer surface 1284 of the fly wheel 118 may be in the appropriate dimension such as about 0.01 millimeters (mm) to about 5 mm and further including about 0.5 mm to about 3 mm, and further including about 0.2 mm to about 2 mm.

The shroud 1280 may block all or substantially all airflow other than along the air-path 1226. In other words, the shroud 1280 may stop or eliminate all or substantially all air flow around the shroud, other than through the stator 120. The shroud 1280 may be selectively installed to direct more or all of the air flow over or past the stator 120. Thus, as discussed herein, the shroud 1280 may be provided to increase efficiency of cooling of the stator 120 and other components of the engine assembly 40 by providing the selected airflow.

The shroud 1280 by being mounted to the housing 1208 and substantially covering the area between the housing 1208 and the surface 1284 of the fly wheel 118, may cause or direct substantially all of the air flow along the air-path 1226 through the vent 106, the stator 120, the air passages 1256 of the fly wheel 118, and through the air vents 1262 of the cover 126. The shroud 128, according to various embodiments, may increase a cooling efficiency and/or amount of cooling of the stator 120. The shroud 1280, when installed, may cause or assist in causing an increased cooling of about 2% to about 20%, further including about 5% to about 15%, and further including about 3% to about 5%. In various embodiments, a measured temperature change between including the shroud 1280 and not including the shroud 1280 may case a temperature change (i.e. decrease) of about 30 degrees Centigrade to about 5 degrees Centigrade, and further including about 5 degrees Centigrade to about 15 degrees Centigrade.

In various embodiments, a temperature differential was determined by placing a temperature sensor (e.g. a thermocouple) to measure a temperature at one or more of the windings 1216 of the stators 120. The engine assembly 40 was run at about 7000 rotations per minute until a measured temperature stabilized. Under selected test conditions, such as those exemplary discussed above, a temperature with the shroud 1280 and the fan assembly 1228 assembled, according to various embodiments, was measured to be about 208 degrees Centigrade as compared to 219 degrees centigrade with only the fan assembly 1228 installed (i.e. without the shroud 1280.

Accordingly the shroud 1280 may increase a cooling efficiency or effectiveness of the stator 120 with the fan assembly 1228, if selected. It is understood, however, the shroud 1280 is not required, but may be included in the engine assembly 40. According to various embodiments, the shroud 1280 may also be formed of appropriate materials including aluminum or aluminum alloys, magnesium or magnesium alloys, other metallic or metal alloys, and appropriate polymers. The shroud 1280, according to various embodiments, therefore, directs or assists in directing airflow of the air-path 1226.

Accordingly the fan assembly 1228 may operate with the engine assembly, such as being driven directly or indirectly by the driveshaft 120 to cause an airflow along the air-path 1226. The airflow along the air-path 1226 may appropriately cool or provide a selected operating temperature of the stator 120. The operating temperature of the stator 120 may, therefore, allow for efficient operation of the stator 120 and the associated electrical components of the snowmobile 10, including the engine assembly 40.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A stator cooling system for an engine assembly, the stator cooling system comprising:
   a crankcase having a throughbore forming a first air flow vent;
   a housing cover having a second throughbore forming a second air flow vent;
   a fan assembly fixed to a flywheel, wherein the fan assembly includes a fin that extends along a curve from near a center of the fan assembly to an outer edge of the fan assembly;
   wherein the fin is configured to cause an airflow at least by drawing air through the first airflow vent and out the second air flow vent.

2. The system of claim 1, wherein the fin of the fan assembly includes a plurality of fins;
   wherein the fan assembly includes a surface between each fin of the plurality of fins;

wherein a pocket is defined between each of the plurality of fins and the surface.

3. The system of claim 2, wherein the surface is formed generally at an angle such that the surface is nearer a top edge of the fin near a center of the fan assembly than at an outer perimeter of the fan assembly.

4. The system of claim 1, further comprising:
a crankshaft; and
the flywheel;
wherein the flywheel is fixedly mounted to the crankshaft and is rotated by the crankshaft;
wherein the fan assembly is rotated by the flywheel.

5. The system of claim 4, wherein the flywheel includes a first wall and a second wall extending substantially perpendicular to the first wall;
wherein the first wall includes a third throughbore forming a third air flow vent;
wherein the fan assembly is mounted to the first wall opposite the second wall.

6. The system of claim 5, wherein the fin of the fan assembly includes a plurality of fins;
wherein the fan assembly includes a surface between each fin of the plurality of fins;
wherein a first edge of each fin is positioned near the first member of the flywheel and each of the fins extends from the surface to the first edge;
wherein a pocket is defined between each of the plurality of fins and the surface and includes an exit passage at an outer perimeter of the fan assembly;
wherein air is operable to be drawn through the third air flow vent of the flywheel and out through the exit passage.

7. The system of claim 1, further comprising:
a shroud mounted between the crankcase and the housing cover:
wherein the shroud includes a central throughbore to direct substantially all of the airflow from the first air flow vent to the second airflow vent through the fan assembly.

8. The system of claim 1, further comprising:
a stator having at least one winding;
wherein the airflow is past the stator.

9. A stator cooling system for an engine assembly, the stator cooling system comprising:
a crankcase having a throughbore forming a first airflow vent, wherein the first airflow vent is spaced apart from an exhaust manifold;
a crankshaft rotatably mounted within the crankcase, wherein the crankshaft is configured to rotate with the crankshaft;
a flywheel fixed to the crankshaft to rotate with the crankshaft;
a fan assembly fixed to the flywheel, wherein the fan assembly includes:
a body member forming a first surface;
a fin that extends in a first direction from the body member and extends in a second direction along a curve from near a center of the fan assembly to an outer edge of the body member;
a housing cover having a second throughbore forming a second air flow vent;
wherein the fin is configured to cause an airflow at least by drawing air through the first airflow vent and out the second air flow vent.

10. The system of claim 9, wherein the fan assembly further includes a recoil assembly cup having a wall extending from the body member in a direction opposite the fin.

11. The system of claim 9, wherein the fin includes a plurality of fins;
wherein each fin has a flywheel contact surface configured to be mounted adjacent the flywheel.

12. The system of claim 11, wherein the adjacent fins and the body member form a pocket;
wherein air is drawn through the flywheel due to rotation of the fan assembly having the plurality of fins.

13. The system of claim 12, wherein each fin of the plurality of fins has a first arcuate surface and a second arcuate surface;
wherein the first arcuate surface and the second arcuate surface extend from near the center of the fan assembly toward an outer perimeter of the body member.

14. The system of claim 9, further comprising:
a stator having at least one winding;
wherein the airflow is past the stator;
wherein the stator is fixed relative to the flywheel.

15. The system of claim 9, further comprising:
a shroud member having a substantially solid member with a single central opening;
wherein the shroud member is mounted between the crankcase and the housing cover;
wherein the single central opening substantially directs all of the airflow from the first air flow vent to the second airflow vent through the fan assembly.

16. A method of directing an airflow in an engine assembly, comprising:
powering the engine assembly to rotate a crankshaft;
rotating a flywheel fixed to the crankshaft;
rotating a fan assembly fixed to the flywheel, wherein the fan assembly includes a curved fin; and
moving air by the rotation of the fan assembly including the curved fin through the engine assembly.

17. The method of claim 16, further comprising:
cooling a stator in the engine assembly due the moving air.

18. The method of claim 16, further comprising:
forming an air-path to start at a cool region of the engine assembly.

19. The method of claim 18, wherein the cool region is spaced apart from an exhaust manifold and near a riding surface.

20. The method of claim 16, further comprising:
forming an air flow path to include a radial flow away from an axis of rotation of the fan assembly out of a pocket between a first fin and a second fin of the fan assembly.

* * * * *